United States Patent
Sims, III et al.

(10) Patent No.: US 6,349,345 B1
(45) Date of Patent: Feb. 19, 2002

(54) AUTOCONFIGURABLE DEVICE THAT PROVISIONALLY CONFIGURES ITSELF AS THE PRIMARY OR SECONDARY PERIPHERAL DEVICE DEPENDING ON IF ANOTHER PERIPHERAL DEVICE IS PRESENT

(75) Inventors: J Robert Sims, III, Fort Collins; Jonathan Firooz, Loveland, both of CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/240,293

(22) Filed: Jan. 29, 1999

(51) Int. Cl.[7] .......................... G06F 13/00; G06F 15/16; G06F 15/177

(52) U.S. Cl. ................... 710/8; 710/11; 710/14; 709/208; 709/209

(58) Field of Search ...................... 710/9, 10, 114, 710/8, 11, 14; 360/73; 709/208, 209

(56) References Cited

U.S. PATENT DOCUMENTS

| | | | |
|---|---|---|---|
| 4,360,870 A | 11/1982 | McVey | 710/9 |
| 4,373,181 A | 2/1983 | Chisholm et al. | 711/211 |
| 4,775,930 A | 10/1988 | Clawson et al. | 714/25 |
| 4,837,680 A | 6/1989 | Crockett et al. | 710/104 |
| 4,907,105 A | 3/1990 | Kurzweil, Jr. | 360/73.02 |
| 5,014,193 A | 5/1991 | Garner et al. | 710/10 |
| 5,247,682 A | 9/1993 | Kondou et al. | 395/700 |
| 5,313,595 A | 5/1994 | Lewis et al. | 710/126 |
| 5,428,748 A | 6/1995 | Davidson et al. | 710/9 |
| 5,519,882 A | 5/1996 | Asano et al. | 710/10 |
| 5,553,245 A | 9/1996 | Su et al. | 710/104 |
| 5,649,233 A | 7/1997 | Chen | 395/800 |
| 5,689,726 A | 11/1997 | Lin | 710/10 |
| 5,745,557 A | 4/1998 | Anglikowski | 379/177 |
| 5,761,460 A | 6/1998 | Santos et al. | 710/129 |
| 5,848,294 A | 12/1998 | Clark | 710/36 |
| 5,852,743 A | 12/1998 | Yeh | 710/18 |
| 5,862,375 A | 1/1999 | Gephardt | 713/1 |
| 5,867,730 A | 2/1999 | Leyda | 710/10 |
| 6,016,518 A * | 1/2000 | Matsushima et al. | 710/8 |
| 6,178,445 B1 * | 1/2001 | Dawkins et al. | 709/209 |

FOREIGN PATENT DOCUMENTS

| | | | |
|---|---|---|---|
| EP | 0629098 A2 | 12/1994 | |
| EP | 0778532 A2 | 6/1997 | G06F/13/40 |
| JP | 07160378 | 6/1995 | G06F/3/00 |

* cited by examiner

*Primary Examiner*—Thomas Lee
*Assistant Examiner*—Tammara Peyton
(74) *Attorney, Agent, or Firm*—Augustus W. Winfield

(57) ABSTRACT

A method of automatically configuring an autoconfigurable computer peripheral device as a primary device or as a secondary device. There are four possible cases: (1) no other device present, (2) legacy primary device present, (3) legacy secondary device present and (4) second autoconfigurable device present. Host computer device configuration application software provides a signal or numerical data indicating a bit position within an identification number within each autoconfigurable device. If a device identification has a particular logical value at the bit position, the device responds to the signal from the computer. If the device identification has a different particular logical value at the bit position, the device determines whether another device is responding to the signal from the computer. If a first device determines that it should not respond, and a second device responds, the first device provisionally configures itself as a secondary device. If all bit positions are exhausted, and a device has not provisionally configured itself as a secondary device, then the device provisionally configures itself as a primary device. The host computer then sends a particular numerical value to the devices. Depending on the particular numerical value, each device configures itself to its provisional configuration, or to the opposite configuration from its provisional configuration, or unconfigures itself.

9 Claims, 3 Drawing Sheets

ND PERIPHERAL DEVICE IS
PRESENT

AUTOCONFIGURABLE DEVICE THAT PROVISIONALLY CONFIGURES ITSELF AS THE PRIMARY OR SECONDARY PERIPHERAL DEVICE DEPENDING ON IF ANOTHER PERIPHERAL DEVICE IS PRESENT

FIELD OF INVENTION

This invention relates generally to computer peripheral devices and more specifically to automatic configuration of primary and secondary devices for personal computers.

BACKGROUND OF THE INVENTION

For personal computers using Intel compatible microprocessors, peripheral devices (for example, magnetic disk drives, compact disc drives, tape drives, and some devices other than mass memory devices) commonly use an industry specified bus interface called AT Attachment (ATA). The computer systems support at least two ATA host adapters (which may be combined on a single printed circuit board), each of which can support up to two peripheral devices. For each host adapter, there may be one primary device (or "master" or device 0) and one secondary device (or "slave" or device 1). In addition, device electronics for a primary device need to be aware of whether there is a secondary device present. Typically, a set of small removable 2-pin connectors (called jumpers) on each device determine, among other things, whether the device is a primary or secondary device, and if primary whether there is a secondary device present. Jumper configurations are not standard, they are typically poorly labeled, and they are typically difficult to access without removing a device. Confusion over jumper requirements has led to a great deal of customer frustration and numerous phone calls to customer service organizations.

Personal computer peripheral devices commonly integrate most of the input/output (I/O) electronics along with the device electronics, using industry specifications called Integrated Drive Electronics (IDE). IDE devices may be designed for many different host computer bus systems, including the AT bus. For Intel compatible personal computers, cabling specifications and signal definitions may be referred to as ATA specifications or IDE specifications, depending on the manufacturer. For Intel compatible personal computers, the most common ATA/IDE mass memory interface cable is a 40-conductor ribbon cable. Connector pin/socket 39 provides a signal called Drive Active/Slave Present (DASP). DASP drivers are implemented as open-collector drivers on the ATA devices. DASP is asserted by driving the line low. DASP is a time multiplexed signal that may be asserted by either device. The signal is used during a power-up/reset initialization phase to indicate that a secondary (slave) device is present, and is used later to indicate device activity. During power-on initialization, if a secondary device is present, the secondary device asserts DASP within 400 milliseconds of power-on. If no secondary device is present, the primary device may assert DASP after a delay of 450 milliseconds after power-on. If a secondary device is present, the secondary device deasserts DASP following the receipt of a valid command or after the secondary device is ready, or after 31 seconds, whichever comes first. Once DASP is deasserted, either device can assert DASP to light a device-activity light emitting diode (LED). If a secondary device is not present, the primary device is then automatically further configured as a primary device with no secondary device present and the primary device then responds to commands sent to a secondary device. If a secondary device asserts DASP within the proper time window, the primary device is automatically further configured as a primary device with a secondary device present and the primary device then does not respond to commands sent to the secondary device. There is no general standard for a provision for a host computer to be able to command a primary device to change its configuration. That is, once a primary device configures itself as "with secondary" or "without secondary" there is no general standard way to override that autoconfiguration.

For ATA/IDE peripheral devices, read and write commands from the host computer are written directly to registers in the peripheral devices. Two signals of interest to the present patent document are Chip-Select-0 (CS0, also known in the industry as CS1FX) and Chip-Select-1 (CS1, also known in the industry as CS3FX) which are asserted by the host (in conjunction with three address lines) to specify a target register in a peripheral device. Typically, about 5 seconds after a system reset, the computer Basic-Input-Output-System (BIOS) asserts CS0 or CS1 as part of an enquiry to see which ATA/IDE devices might be present. A configured device responds by asserting an interrupt signal (INTRQ).

One industry effort to eliminate the need for configuration jumpers for determination of primary/secondary device status is included in an industry specification called Plug and Play ATA. In Plug and Play ATA, primary/secondary device status is determined by which one of two cable connectors is attached to a device. Plug and Play ATA dedicates one wire of a standard interface cable to a signal called Cable Select. The Cable Select line is grounded by the host computer. In the interface cable, the Cable Select line connects to its corresponding socket in the connector for a primary device, and does not connect to its corresponding socket in the connector for a secondary device. If a device connected to the interface cable detects that the Cable Select line is grounded, the device configures itself to be a primary device, and if the device does not detect a ground potential on the Cable Select line the device configures itself to be a secondary device.

Automatic address determination is also a problem for the I/O boards on the I/O bus of the host computer. For Intel compatible computers, one industry specification for automatically configuring I/O boards for the ISA bus is called the Plug and Play ISA Standards. For ISA Plug and Play, each compatible I/O card has a unique identifier that includes a vendor identifier and a serial number. Each compatible I/O card can read its own identifier. The host computer first places all the cards into a configuration mode. Then the host computer drives a line with a series of transitions indicating sequential bit positions within each identifier. At the end of each series, at most only one I/O card remains active. The sequence of bits from the host computer logically progresses from least-significant-bit to most-significant-bit for the identifiers. At each bit position in the sequence, each compatible I/O card determines whether its identifier has a logical one in the same bit position. If the I/O card identifier has a logical one in the same position, the I/O card drives the bus to a particular value. If at any bit position in the sequence an I/O card identifier has a logical zero at the bit position, the I/O card does not drive the bus, and determines whether any other card is driving the bus to the particular value. If at any bit position in the sequence an I/O card identifier has a logical zero at the bit position and another card is driving the bus to the particular value, the I/O card having a logical zero at the bit position ceases to participate in the remainder of the sequence. At the end of all the bit positions for an identifier, one card remains. This card is assigned a logical device number by the host. The sequence is then repeated to isolate another card and so forth until all cards have been assigned an address.

Another common interface standard for ATA devices is the Small Computer System Interface (SCSI). SCSI also requires a unique ID for each device. An industry group has proposed a set of specifications, called Plug and Play SCSI, which among other things provides automatic assignment of unique SCSI IDs. The particular protocol for assignment of unique IDs is called SCSI Configured AutoMagically (SCAM). Each SCAM compatible device has a default ID saved in a non-volatile device memory. A SCAM master device first commands each of the other SCAM devices, one at a time, to go into an inactive state. Then, the master device uses a protocol similar to the protocol for ISA Plug and Play to isolate each device for assignment of a SCSI address.

Plug and Play ATA substantially improves ease of use when it is implemented for new systems. However, many new devices need to be installed into systems that predate the Plug and Play ATA specifications. In addition, Plug and Play ATA is not a universally adopted standard, so that devices installed into some new systems still may require jumper configuration.

There is a need for further improvement for automatic determination of primary/secondary device status when a new device is installed, particularly for devices being installed into older or non-standard systems.

SUMMARY OF THE INVENTION

A computer system in accordance with the invention includes special device configuration software to be executed on the host computer. This device configuration software is run anytime a new device is installed, or anytime a change of configuration is desired. A peripheral device in accordance with the invention responds to a series of host computer peripheral driver commands during execution of the device configuration software, using a protocol similar to the Plug and Play ATA protocol. However, instead of setting an I/O address for an I/O board, a protocol in accordance with the invention is used to determine primary and secondary configuration for autoconfigurable devices connected to an I/O board. In addition, a protocol in accordance with the invention may be used to change the configuration of previously configured devices. Accordingly, in contrast to Plug and Play ATA, devices in accordance with the invention continue to monitor the host signals until the end of the sequence.

As part of the device configuration software, the host computer sends a series of signals or numbers to each device. Each signal sent by the host computer corresponds to a bit position of a device ID. If the device ID has a logical "one" at the bit position, the device asserts DASP. If the device ID has a logical "zero" at the bit position, the device checks to see if DASP is being asserted by some other device. If a first device detects that a second device is asserting DASP, the first device provisionally designates itself as a secondary device. A device with provisional secondary configuration will not assert DASP during the remainder of the sequence. A device that completes the sequence without detecting DASP from a second device provisionally designates itself as a primary device. Then, the host computer sends a numerical value. If the numerical value is a first predetermined value, each device configures itself to the provisional configuration. That is, a provisional primary device configures itself as a primary device and a provisional secondary device configures itself as a secondary device. If the numerical value is a second predetermined value, each device configures itself to the opposite of the provisional configuration. That is, a provisional secondary device configures itself as a primary device and a provisional primary device configures itself as a secondary device. If the numerical value is a third predetermined value, devices in accordance with the invention unconfigure themselves.

DETAILED DESCRIPTION OF THE PREFERRED EMBODIMENT OF THE INVENTION

Figure 1A:
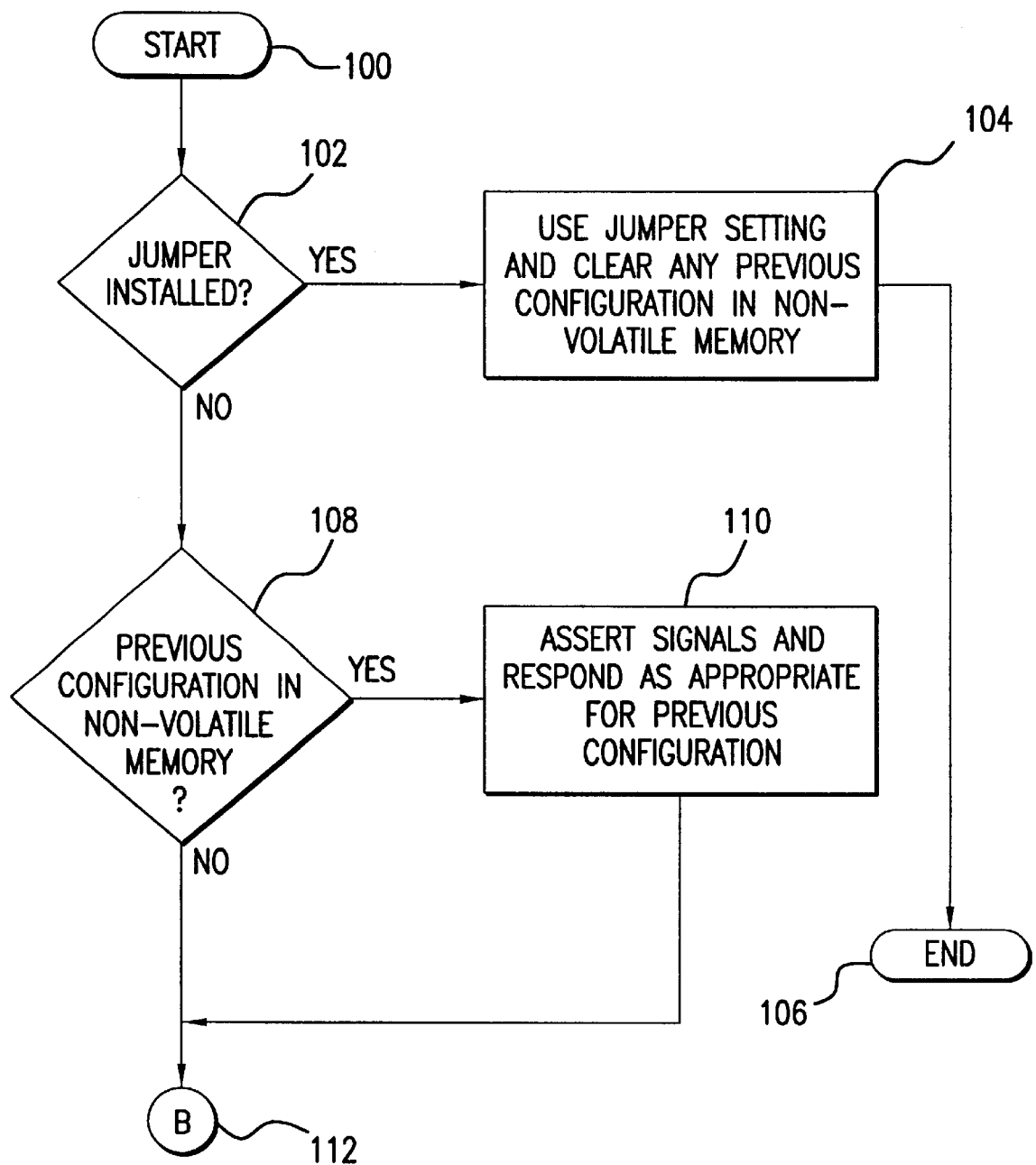
FIG. 1A is a flow chart of part of an example embodiment of a method in accordance with the invention.

In the following example embodiment of the invention, a device referred to as an autoconfigurable device means a device having specifications in accordance with the invention. A device having specifications in accordance with the invention may be initially unconfigured, neither a primary device or a secondary device. Alternatively, a device having specifications in accordance with the invention may have been previously configured, with configuration saved in non-volatile memory, but the device may then be unconfigured or reconfigured during an initialization protocol described below. A device that does not conform to the specifications in accordance with the invention is referred to as a legacy device. Note that a device conforming to Plug and Play ATA may be initially "unconfigured" but if it does not also conform to the specifications of the invention it is considered to be a legacy device for purposes of the invention. For autoconfigurable devices in accordance with the invention, all autoconfigurable devices reconfigure every time the device configuration software is run by the host computer. In the example embodiment, an autoconfigurable device is being added to an ATA/IDE system. There may or may not be another device already present. There are four possible cases as follows: (1) no other device present, (2) legacy primary device present, (3) legacy secondary device present and (4) another autoconfigurable device (in accordance with the invention) present.

Presently available computer power-on/reset software detects which legacy devices (if any) are present. For example, if a primary legacy device is present along with an unconfigured autoconfigurable device, the primary legacy device will be detected by the host computer during initialization, but the autoconfigurable device will not respond to host computer commands and will be not be visible to the host computer.

The present invention is primarily concerned with electronic device identification at the peripheral device hardware level and host software driver level. Independent of hardware identification and driver identification, host operating system software may have a separate identification for peripheral devices. For for mass memory devices, the host operating system may refer to the devices as Drive C, or Drive D, and so forth.

In the following example embodiment, autoconfigurable devices have a unique identification number in an electronic form readable by the device controller electronics. The identification number may, for example, comprise an assigned unique manufacturer number plus a factory determined serial number for the device. Autoconfigurable devices reconfigure every time the device configuration software is run by the host computer, but two given identification numbers will always configure the same way. Therefore, for any particular pair of devices, the configuration will stay constant until a device is removed or added. Note that the approach is consistent with the configuration philosophy of Plug and Play SCSI, in which device configuration is completely automatic, and may automatically change when a device is deleted or added. However, in contrast to Plug and Play ATA or Plug and Play SCSI, devices in accordance with the present invention enable a host computer to override the configuration that would normally result from the identification numbers.

Because of a lack of rigid industry standards, automatic configuration as taught in the present patent document may not work for all systems. Therefore, autoconfigurable devices in accordance with the invention may still have provision for optional jumpers to ensure that configuration is possible in all systems. Preferably, if configuration jumpers are present, the jumpers determine the configuration. Specifically, at power-on/reset, an autoconfigurable device should check its jumper block. If a jumper is set, the device should clear any configuration information in non-volatile memory (if present) and proceed with the initialization process according to the jumper setting. If no jumpers are present, then the autoconfigurable device should follow the autoconfiguration procedures discussed below in this patent document.

Figure 1B:
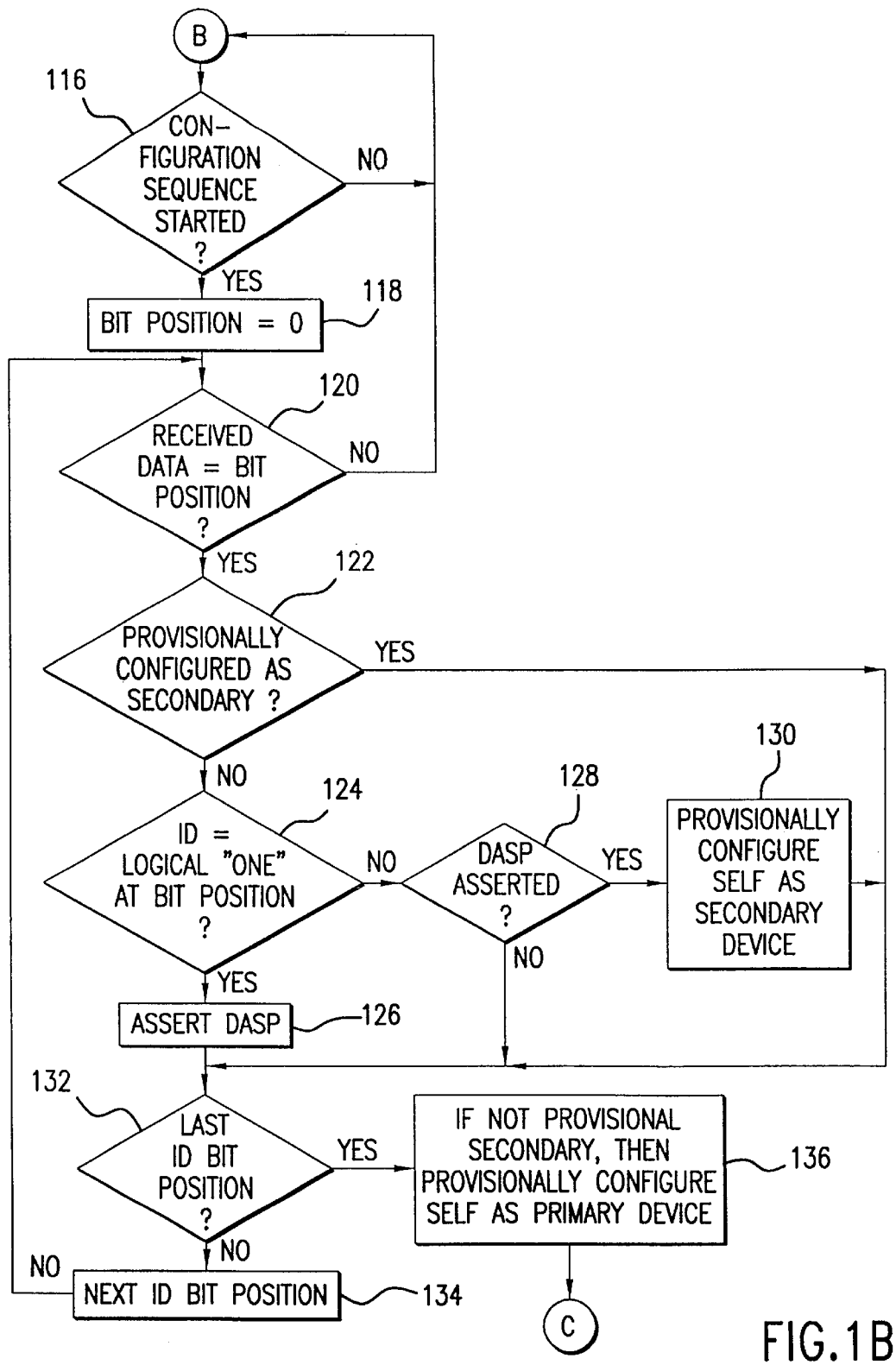
FIG. 1B is a flow chart continuation of FIG. 1A.
Figure 1C:
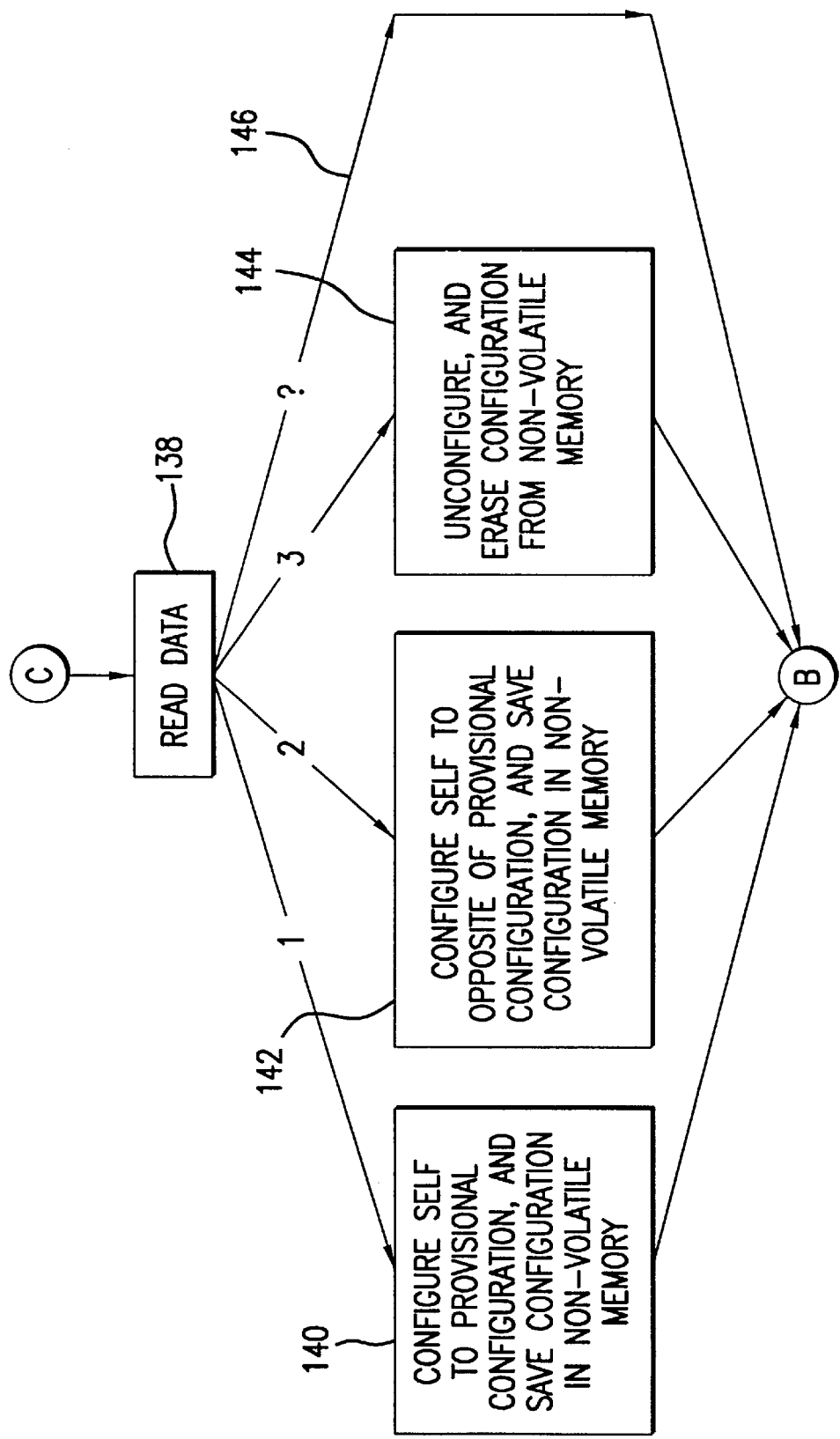
FIG. 1C is a flow chart continuation of FIG. 1B.

FIGS. 1A through 1C illustrate an example embodiment of the invention. In FIG. 1A, at step 100, a system reset starts the process of configuration. As discussed above, autoconfigurable devices may have an alternative provision for configuration jumpers. Accordingly, if jumpers are installed (test 102), the jumpered configuration is used (step 104), any configuration information in non-volatile memory is erased, and the automatic configuration process is bypassed (step 106). If no jumpers are present, an autoconfigurable device first checks to see if it has been previously configured, with the previous configuration stored in non-volatile memory. If the device has been previously configured, the device asserts signals and monitors signals consistent with standard protocols as discussed above (step 110). After completing the normal initialization protocols in step 110, or if the device is unconfigured without jumpers, a device enters a loop in which the device is continuously monitoring signals to determine whether or not the host computer configuration software is running (FIG. 1B).

Historically, hard disk drives for Intel compatible personal computers had limited processing power on the drive units, and instead relied on controller electronics on a separate controller board. Later, much of the functionality originally present on the controller boards was placed onto the drives. ATA has evolved to be applicable to devices other than hard disks, but signals and registers still retain names that started with the original configuration having a controller board with two hard disk drives. For example, current ATA devices may have cylinder registers, head registers, and sector registers, even though the devices do not have cylinders, heads, or sectors. In particular, autoconfigurable devices in accordance with the present invention, like other ATA device, have various registers. In a specific example embodiment, the registers include a 16-bit data register, two 8-bit cylinder registers, an 8-bit head register, an 8-bit sector register, a command register, and various other registers. The standard ATA cable includes 3 address lines (to address 8 registers), 16 data lines, and read and write strobe lines. In general, a host computer can write to registers in unconfigured ATA devices, but unconfigured ATA devices will not respond to commands.

As discussed above, autoconfigurable devices in accordance with the invention require special configuration software in the host computer. As an optional first step, it may be desirable for an autoconfigurable device to have some indication that compatible configuration software is running. One simple method is to have the configuration software write predetermined data values to at least one of the registers. For example, after a reset, the host configuration software may write predetermined values to any of the data register, the cylinder registers, the head registers and the sector registers. In FIG. 1B, step 116, the autoconfigurable device checks the appropriate registers for the predetermined values. Since devices may be reconfigured at any time, FIG. 1B, step 116, is a default state (loop) for autoconfigurable devices. If the values are present, then a counter is initialized (step 118), and a configuration loop (steps 120–134) is entered.

During the configuration loop, the host computer needs to send a signal to the autoconfigurable device indicating a bit position within an identification code. The autoconfigurable device could have an internal counter that responds to a pulse from the host computer. Alternatively, the host computer could send numerical data which the autoconfigurable device could then decode to determine a bit position. Alternatively, for further insurance to prevent an autoconfigurable device from responding to host signals that are not intended for autoconfiguration, the autoconfigurable device may have an internal counter and receive numerical data from the host, and repeatedly compare the two values for assurance. The example embodiment below uses the third method, where the autoconfigurable device has an internal counter and receives numerical data from the host computer.

During one of the iterations of the configuration loop, an autoconfigurable device may determine that it should be configured as a secondary device. At that point, the autoconfigurable device could simply configure itself as a secondary device and then cease to participate in the loop protocol. However, additional goals of the present invention are to enable a host computer to unconfigure previously configured devices, and to enable the host computer to override the normal configuration selection. Therefore, an autoconfigurable device in accordance with the present invention provisionally determines a configuration, but continues to participate for all iterations of the configuration loop. This helps to ensure that the host commands are actually from a configuration driver, and also provides end-of-loop information for the autoconfigurable device for the final configuration step. After the last iteration of the configuration loop, the host computer commands each device to: (1) configure itself in accordance with the provisional configuration; or (2) to configure itself opposite to the provisional configuration; or (3) to unconfigure itself.

For each iteration of the configuration loop, the host driver writes a data value to the data registers of all ATA devices. Each autoconfigurable device has an internal counter. For each iteration of the loop, each autoconfigurable device increments (or decrements, as appropriate) the internal counter. For each iteration of the loop, the internal counter should have a value that is identical to the value received from the host computer (decision 120). In a specific example embodiment, an identification has 256 bits, and a configuration loop is executed 256 times, once for each bit position of the identification. The host computer (and internal counter) may count up to 255 from zero, or down from 255 to zero. If the values do not match, an error has occurred and autoconfiguration cannot be accomplished. If the values match, the autoconfigurable device determines whether it has already provisionally determined a configuration (during an earlier iteration of the loop) (decision 122). If the autoconfigurable device has not been provisionally configured, the autoconfigurable device checks to see if the bit position, corresponding to the internal counter, of the identification, is a logical "one" (decision 124). If the identification has a logical "one" at the bit position determined by the internal counter, the autoconfigurable device asserts DASP (step 126) until other activity is detected on the ATA bus, or until a timeout occurs, whichever occurs first. If the identification does not have a logical "one" at the bit position determined by the internal counter, the autoconfigurable device does not assert DASP, and checks to see if DASP is being driven by some other device decision 128). If some other device is driving DASP at an identification bit position containing a logical "zero," the autoconfigurable device provisionally determines that it should be configured as a secondary device (step 130). Of course, decision 124 could be based on sensing a logical "zero" instead of a logical "one."

The autoconfigurable device then checks to see if the last ID bit position has been checked (decision 132). If the last ID bit position has not been checked, the autoconfigurable device increments (or decrements) the internal counter (step 134), and goes through the loop for another iteration. If the last ID bit position has been checked, and if the autoconfigurable device has not been provisionally configured as a secondary device, the autoconfigurable device provisionally determines that it should be configured as a primary device (step 136). That is, a device that completes the loop without ever detecting that another device is asserting DASP at an ID bit position containing a logical zero provisionally determines that it should be configured as a primary device. Each autoconfigurable device then goes to the final configuration step (FIG. 1C).

After the final iteration of the loop, the host computer driver sends one final value to the data register (or any other predetermined register) (step 138). If the final value is a first predetermined number, each autoconfigurable device configures itself in accordance with the provisional configuration (step 140). That is, a provisional primary device configures itself as a primary device and a provisional secondary device configures itself as a secondary device. If the final value is a second predetermined number, each autoconfigurable device configures itself to the opposite of the provisional configuration (step 142). That is, a provisional primary device configures itself as a secondary device and a provisional secondary device configures itself as a primary device. If the final value is a third predetermined number, each autoconfigurable device unconfigures itself (step 144). If the value is not one of the three expected predetermined values (path 146), an error has occurred and autoconfiguration is not completed.

Consider FIGS. 1A and 1B in light of the four possible cases:

(1) No other device present. An autoconfigurable device will have no jumpers (decision 102), and will not see DASP at ID bit positions having a logical "zero" (decision 128), and the autoconfigurable device will therefore provisionally configure itself as a primary device (step 136).

(2) Legacy primary device present. The host computer will detect that a legacy primary device is present. An autoconfigurable device will have no jumpers (decision 102), and will not see DASP at ID bit positions having a logical "zero" (decision 128), and the autoconfigurable device will therefore provisionally configure itself as a primary device (step 136). After the configuration loop is complete, the host computer will send the proper predetermined value to cause any provisional configured device to configure itself to the opposite of its provisional configuration (step 142). Accordingly, the autoconfigurable device will configure itself as a secondary device.

(3) Legacy secondary device present. The host computer will detect that a legacy secondary device is present. An autoconfigurable device will have no jumpers (decision 102), and will not see DASP at ID bit positions having a logical "zero" (decision 128), and the autoconfigurable device will therefore provisionally configure itself as a primary device (step 136). After the configuration loop is complete, the host computer will send the proper predetermined value to cause any provisional configured device to configure itself to its provisional configuration (step 140). Accordingly, the autoconfigurable device will configure itself as a primary device.

(4) Another autoconfigurable device present. Each autoconfigurable device will reach step 116 and both autoconfigurable devices will complete the configuration iteration loop. One of the two devices will detect DASP at an ID bit position containing a logical "zero" (step 128) and that device will provisionally configure itself as a secondary device (130). The other device will then never detect DASP and will provisionally configure itself as a primary device (step 136).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of automatically configuring an autoconfigurable device electrically coupled to a computer, the method comprising the following steps:

receiving, by the autoconfigurable device, from the computer, a sequence of numerical values;

determining, by the autoconfigurable device, for each numerical value from the computer, whether another device is responding to the numerical value from the computer; and provisionally configuring, by the autoconfigurable device, itself as a primary device when no other device responds to selected numerical values from the computer.

2. The method of claim 1, further comprising:

receiving, by the autoconfigurable device, from the computer, a predetermined numerical value;

configuring, by the autoconfigurable device, in response to the predetermined numerical value, itself as a primary device.

3. The method of claim 1, further comprising:

receiving, by the autoconfigurable device, from the computer, a predetermined numerical value;

configuring, by the autoconfigurable device, in response to the predetermined numerical value, itself as a secondary device.

4. The method of claim 1, further comprising:

receiving, by the autoconfigurable device, from the computer, a predetermined numerical value;

unconfiguring, by the autoconfigurable device, in response to the predetermined numerical value, itself.

5. A method of automatically configuring an autoconfigurable device electrically coupled to a computer, the method comprising the following steps:

receiving, by the autoconfigurable device, from the computer, numerical data;

determining, by the autoconfigurable device, that another autoconfigurable device is responding to the numerical data from the computer; and provisionally configuring, by the autoconfigurable device, itself as a secondary device.

6. The method of claim 5, further comprising:

receiving, by the autoconfigurable device, from the computer, a predetermined numerical value;

configuring, by the autoconfigurable device, in response to the predetermined numerical value, itself as a secondary device.

7. The method of claim 5, further comprising:

receiving, by the autoconfigurable device, from the computer, a predetermined numerical value;

configuring, by the autoconfigurable device, in response to the predetermined numerical value, itself as a primary device.

8. The method of claim 5, further comprising:

receiving, by the autoconfigurable device, from the computer, a predetermined numerical value;

unconfiguring, by the autoconfigurable device, in response to the predetermined numerical value, itself.

9. A method of automatically configuring an autoconfigurable device electrically coupled to a computer, the method comprising the following steps:

receiving, by the autoconfigurable device, from the computer, a signal indicating a bit position within an identification number for the autoconfigurable device;

determining, by the autoconfigurable device, based on its identification number, that it should not respond to the signal from the computer;

provisionally configuring, by the autoconfigurable device, itself as a secondary device, when a second device responds to the signal from the computer;

receiving, by the autoconfigurable device, a numerical value from the computer; and configuring, by the autoconfigurable device, itself, to a configuration determined by its provisional configuration and the numerical value received from the computer.

* * * * *